(12) United States Patent
Kato et al.

(10) Patent No.: US 6,520,680 B2
(45) Date of Patent: Feb. 18, 2003

(54) LINEAR GUIDE

(75) Inventors: Soichiro Kato, Gunma (JP); Yutaka Igarashi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/903,563

(22) Filed: Jul. 13, 2001

(65) Prior Publication Data

US 2002/0018602 A1 Feb. 14, 2002

(30) Foreign Application Priority Data

Jul. 13, 2000 (JP) .................................... 2000-212113
Oct. 19, 2000 (JP) .................................... 2000-318681
Oct. 23, 2000 (JP) .................................... 2000-322104

(51) Int. Cl.$^7$ ............................................. F16C 29/06
(52) U.S. Cl. .................................................. 384/45
(58) Field of Search ........................... 384/45, 43, 44; 464/168

(56) References Cited

U.S. PATENT DOCUMENTS 4,732,489 A * 3/1988 Tanaka ........................ 384/45
4,744,551 A * 5/1988 Chitayat ...................... 384/43

* cited by examiner

*Primary Examiner*—Lenard A. Footland
(74) *Attorney, Agent, or Firm*—Sughrue Mion, PLLC

(57) ABSTRACT

In a linear guide which includes a guide rail, a slider and a plurality of rolling elements. The guide rail has at its outer surfaces rolling element rolling grooves extending in the axial direction thereof. The slider is assembled to the guide rail and has rolling element rolling grooves opposing to the rolling element rolling grooves of the guide rail. The plurality of rolling elements are filled within rolling element rolling paths formed by both the rolling grooves so as to toll freely therein. At least a part of the rolling element rolling grooves of the guide rail and the slider has a surface having the average roughness Ra along the center line of 0.20 μm or less, to thereby provide a linear guide in which reduction of a sliding resistance and generation of powder due to the abrasion caused by the initial abrasion is hardly caused.

7 Claims, 6 Drawing Sheets

LINEAR GUIDE

BACKGROUND OF THE INVENTION

The present invention relates to a linear guide, particularly relates to a linear guide used in industrial machines etc. Further, the present invention also relates to a linear guide that is suitably used in a stepper etc. used in a semiconductor element fabrication process.

Conventionally, as a linear guide used in general, there is known one, for example, which includes a guide rail 1 extending in the axial direction thereof and a slider 2 assembled to the guide rail 1 so as to cross over the rail, as shown in FIG. 1. In such a linear guide, rolling element rolling grooves 3, 3, 3, 3 are formed along the axial direction thereof at both side surfaces 1b, 1b of the guide rail 1.

As shown in FIGS. 1 and 2, the slider 2 is formed by a slider main body 2A and end caps 2B, 2B attached to the both end portions of the main body along the axial direction thereof. The slider main body 2A has rolling element rolling grooves 4, 4, 4, 4 opposing to the rolling element rolling grooves 3, 3, 3, 3 of the guide rail 1 at the inner side surfaces of both sleeve portions 6, 6, respectively, and rolling element return paths 11, 11, 11, 11 penetrating the thick portions of the sleeve portions 6, 6 in the axial direction thereof (see FIG. 2). These opposed rolling element rolling grooves 3, 3, 3, 3 and 4, 4, 4, 4 form rolling element rolling paths 10, 10, 10, 10.

As clear from FIG. 3 showing the plan view of the linear guide in which the slider 2 is partially cut-away, the end caps 2B, 2B have curved paths 12 each for communicating the rolling element rolling path 10 and the rolling element return path 11 disposed in parallel to each other. The rolling element rolling path 10, the rolling element return path 11 and the curved paths 12 at the both ends thereof form a rolling element circulation path. Many rolling elements 5 formed by steel balls, for example, are filled within the rolling element circulation path.

The slider 2 assembled to the guide rail 1 moves smoothly along the guide rail 1 through the rolling operation of the rolling elements 5 within the rolling element rolling paths 10, and the rolling elements 5 circulate endlessly while rolling within the rolling element circulation path of the slider 2.

Side seals 7 for sealing the openings of gaps between the guide rail 1 and the slider are attached to the both end portions (the end surfaces of the respective gaps 2B) of the slider 2. A symbol 8 of FIG. 1 depicts a grease nipple.

In such a conventional linear guide, the surface roughness of the rolling element rolling grooves 3, 4 is set in a manner that the average roughness Ra along the center line thereof is more than 0.20 $\mu$m by the grinding finishing process etc.

However, the aforesaid conventional linear guide has a problem that abrasion (initial abrasion) due to the shake-down among the members occurs at the initial stage of the usage (upon running of several km), so that the sliding resistance likely reduces and powder of the members due to the abrasion is likely generated.

Further, when the aforesaid linear guide is used in the working machine, since the sliding resistance changes with the lapse of time as described above, there arises a problem that the accuracy of the processing performed by using the working machine is badly influenced.

Further, since the sliding resistance changes in accordance with the moving speed of the slider 2, when the cutting speed changes in the processing (for example, arc cutting etc.) performed by the working machine, there also arises a problem that the resistance value varies and so the processing with high accuracy can not be realized.

In addition to this, conventionally, the stepper (micro projection exposure apparatus) used in the semiconductor element fabrication process employs high-energy light such as excimer laser etc. as a light source. The linear guide for the stepper is usually lubricated by fluoro grease. The fluoro grease is a mixture of a base oil composed of liquid fluorinated polymer oil and a thickening agent composed of solid fluorinated polymer. Although the liquid fluorinated polymer oil is not necessary limited, there may be used perfluoro-polyether (hereinafter referred to as "PFPE"), a telomer of trifluoro-ethylene, fluoro-siliconepolymer, or the like. As the solid fluorinated polymer, there may be used polytetrafluoro-ethylene (hereinafter referred to as "PTFE"), a copolymer of tetrafluoro-ethylene and hexafluoro-propene, a copolymer of tetrafluoro-ethylene and perfluoro-propylvinylether, a mixture of these polymers, or the like. This is because, it is not preferable to use the stepper in such a circumstance where dust is likely generated. Further, when light with a high energy is irradiated on general grease (lithium system or urea system), vapor is generated from the grease and adhered to a lens, so that the lens is required to be exchanged frequently.

As shown in FIG. 4, the linear guide is configured by a guide rail 1, a slider 2 and rolling elements 3. The guide rail 1 has rolling element rolling grooves 11 extending in parallel to each other along the longitudinal direction thereof at both side surfaces 1b thereof. The slider 2 is engaged with the guide rail 1 so as to cross over the rail in a manner that the both inside surfaces 2a of the slider 2 are disposed to oppose to the both side surfaces 1b of the guide rail 1, respectively. Rolling element rolling grooves 12 are formed at the both inside surfaces 2a of the slider 2 so as to oppose to the rolling element rolling grooves 11 of the guide rail 1, respectively. The linear guide is arranged in a manner that when the rolling elements 3 roll along rolling paths formed by the both rolling element rolling grooves 11, 12, the slider 2 slides along the guide rail 1.

Although a general linear guide has two pairs of rolling paths, that is, four columns of rolling paths, a small-sized linear guide for a stepper etc. has a pair of rolling paths, that is, two columns of rolling paths as shown in this figure. In this case, when a preload is applied, since the rolling element contacts with the rolling path at four points, there,arises a problem that differential slip becomes large. Further, it is required to make the friction small so as to drive the linear guide under the electronic control Thus, since the exposed thread due to the preload is suppressed to about 1 $\mu$m, a setting preload may not be held due to a slight abrasion. If the setting preload is not held, the accuracy of the linear guide degrades.

When the rolling element rolling grooves of the linear guide are lubricated by the fluoro grease which is deteriorated in lubrication characteristics as compared with general grease, initial abrasion of the linear guide occurs in a relatively short time.

Further, in the case of using a linear motor as the driving apparatus in order to attain a high acceleration and deceleration, the changes of the friction force becomes larger and so oscillation may occur.

Thus, in the case of lubricating the rolling element rolling grooves of the linear guide (particularly, a small-sized linear guide) by the fluoro grease, since the setting preload is not likely held at the time of the initial abrasion, there arises a problem that the accuracy of the linear guide is apt to degrade in a short time.

SUMMARY OF THE INVENTION

Accordingly, an object of the invention is to solve the problems of the aforesaid conventional linear guide. It is an object of a first aspect of the present invention to provide a linear guide in which reduction of a sliding resistance and generation of powder due to the abrasion caused by the initial abrasion are not easily occurred.

In order to solve the aforesaid problems, the first aspect of the present invention is configured in the following manner. That is, in the linear guide which includes a guide rail having at its outer surfaces rolling element rolling grooves extending in an axial direction thereof, a slider which is assembled to the guide rail and has rolling element rolling grooves opposing to the rolling element rolling grooves of the guide rail, and a plurality of rolling elements filled within rolling element rolling paths formed by both the rolling element rolling grooves of the guide rail and the slider so as to roll freely therein. In the linear guide, at least a part of the rolling element rolling grooves of the guide rail and the slider is set to have an average roughness Ra along a center line thereof of 0.20 μm or less.

According to such a configuration, since the surface of the rolling element rolling grooves is smooth, the reduction rate of the sliding resistance due to the initial abrasion can be suppressed to 10% or less and further the generation of powder due to the abrasion can also be suppressed. Thus, since the time-lapse change of the sliding resistance is small, the processing with high accuracy can be realized when the linear guide is used in the working machine. Further, since the change of the sliding resistance in accordance with the moving speed of the slider is small, even if the grinding speed changes in the processing (for example, the arc cutting processing etc.) using the working machine, the degree of the change of the sliding resistance is small and so the processing with high accuracy can be realized.

Further, since the abrasion coefficient at the time of the rolling of the rolling elements is low, the sliding resistance at the initial stage can be made small while maintaining the efficiency of the rigidity etc. to almost the same degree. Furthermore, noise caused upon usage of the linear guide (running of the slider) can be made small.

Such effects can be easily obtained, in particular, when the rolling element contacts with the rolling element rolling path at four points.

In the above-mentioned linear guide, it is advantageous to comprise fluoro grease for lubricating the rolling element rolling grooves of the guide rail and the rolling element rolling grooves of the slider.

In addition, in the above-mentioned linear guide, said surface may be subjected to precise finishing process after grinding process. The precise finishing process can be selected from the group essentially consisting of super finishing process, honing process, lapping process, polishing process, buffing process, and tape process (polishing process using a polishing tape).

Moreover, the invention has been made in view of the aforesaid problems of the prior art. It is an object of a second aspect of the present invention to hold the accuracy of a linear guide for a long time even when the linear guide is lubricated by the fluoro grease.

In order to solve the aforesaid problem, a linear guide according to the second aspect of the present invention is configured by a guide rail having at its outer surfaces rolling element rolling grooves extending in parallel to each other along a longitudinal direction thereof, a slider engaged with the guide rail so as to cross over the guide rail and having rolling element rolling grooves opposing to the rolling element rolling grooves of the guide rail at its inner surfaces disposed so as to oppose to the outer surfaces, respectively, and rolling elements, whereby the rolling elements roll along rolling paths formed by the opposed rolling element rolling grooves to thereby slide the slider along the guide rail, and wherein the rolling element rolling grooves of the guide rail and the rolling element rolling grooves of the slider are lubricated by fluoro grease and subjected to precise finishing process after grinding process so that surface roughness (Ra) of the rolling element rolling grooves is equal to or less than 0.20 μm.

As concrete examples of the precise finishing process, there are the super finishing process, the honing process, the lapping process, the polishing process, the buffing process, the tape process (polishing process using a polishing tape) etc.

DETAILED DESCRIPTION OF THE PREFERRED EMBODIMENTS

Figure 1:
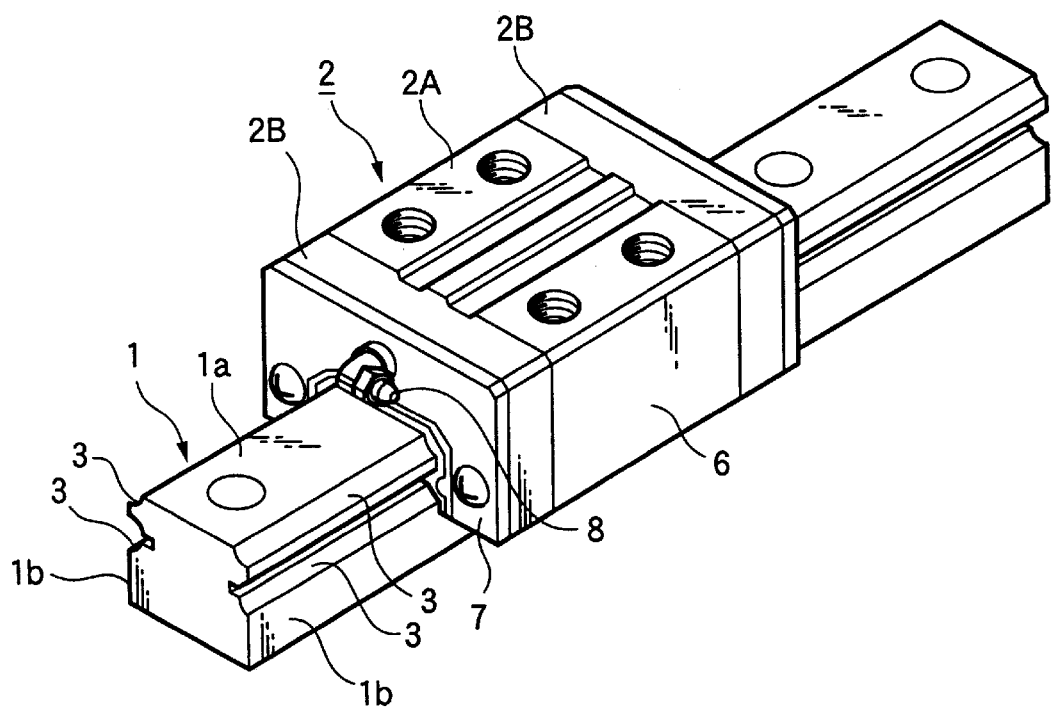
FIG. 1 is a perspective view showing an embodiment of the linear guide according to the invention.
Figure 2:
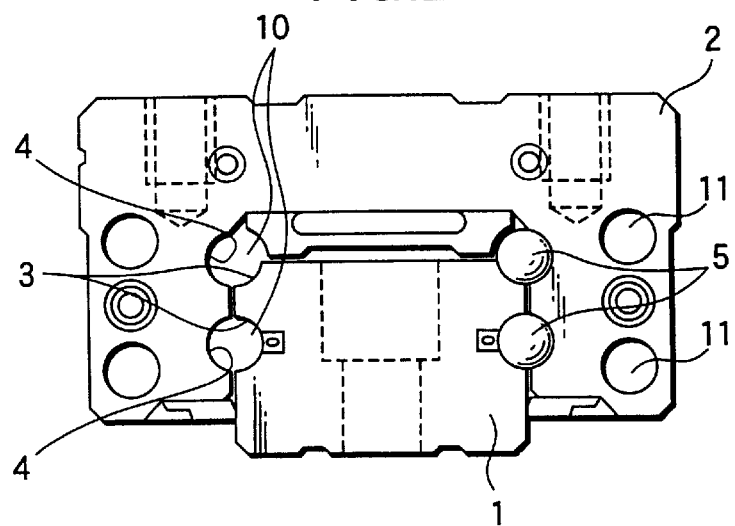
FIG. 2 is a front view of the linear guide of FIG. 1.
Figure 3:
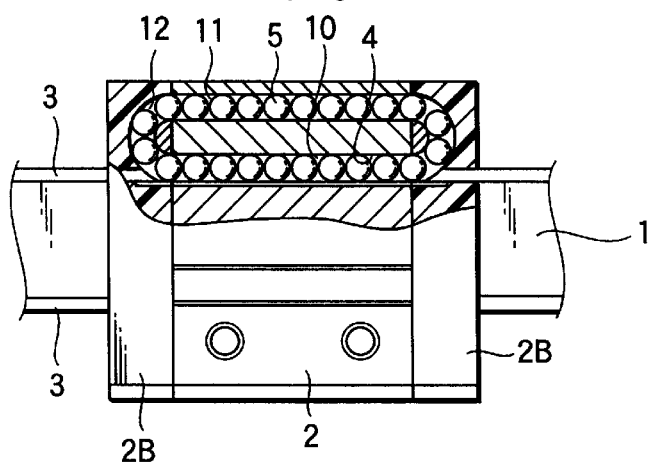
FIG. 3 is a plan view showing the linear guide of FIG. 1 in which a part thereof is cut away.

Preferred embodiments of the linear guide according to the invention will be explained in detail with reference to the accompanying drawings. FIG. 1 is a perspective view showing the embodiments of the linear guide according to the invention. FIG. 2 is a front view of the linear guide of FIG. 1, and FIG. 3 is a partially cut-away plan view of the linear guide of FIG. 1.

First, the explanation will be made as to the structure of the linear guide according to the embodiment.

The slider 2 having the almost ⊐-shaped configuration in its cross section is assembled on the guide rail 1 of angular shape so as to be relatively movable along the axial direction thereof. The rolling element rolling grooves 3, 3 each formed by a concave groove of almost ¼ circular-shape in section extending in the axial direction are formed at ridge line portions where the upper surface 1a and the both side surfaces 1b, 1b of the guide rail 1 cross, respectively. Further the other rolling element rolling grooves 3, 3 each formed by a concave groove of almost semi-circular shape in section extending in the axial direction are formed at the center portions of the both side surfaces 1b, 1b of the guide rail 1, respectively The slider 2 is configured by the slider main body 2A and the end caps 2B, 2B which are attached to the both end portions of the main body along the axial direction thereof so as to be detachable, respectively. The rolling element rolling grooves 4, 4 of almost semi-circular shapes in section are formed so as to oppose to the rolling element rolling grooves 3, 3 of the guide rail 1 at the corner portions of the inner side surfaces of the both sleeve portions 6, 6 of the slider main body 2A, respectively. The other rolling element rolling grooves 4, 4 of almost semi-circular shapes in section are formed so as to oppose to the rolling element rolling grooves 3, 3 of the guide rail 1 at the center portions of the inner side surfaces of the both sleeve portions 6, 6, respectively The rolling element rolling grooves 3, 3, 3, 3 of the guide rail 1 and the rolling element rolling grooves 4, 4, 4, 4 of the both sleeve portions 6, 6 form the rolling element rolling paths 10, 10, 10, 10. Each of these rolling element rolling paths 10 is configured in a linear shape having a circular shape in section.

Further, the slider 2 has the rolling element return paths 11, 11, 11, 11 formed by through holes of circular shapes in section which pass in the axial direction in parallel to the rolling element rolling paths 10 at the upper and lower portions of the thick portions of the sleeve portions 6, 6 of the slider main body 2A, respectively.

Each of the end caps 2B, 2B is formed by composite resin, for example, in almost ⊐-shape in its section. Each of the end caps has the curved paths 12 of semi-doughnut shapes each for communicating the rolling element rolling path 10 and the rolling element return path 11 disposed in parallel to each other, at the abutment surface (rear surface) between the end caps and the slider main body 2A, respectively.

The rolling element rolling path 10, the rolling element return path 11 and the curved paths 12 at the both ends thereof form a rolling element circulation path. Many rolling elements 5 formed by steel balls, for example, are filled within the rolling element circulation path so as to roll freely therein.

When the slider 12 assembled to the guide rail 1 is moved along the guide rail 1 in the axial direction thereof, the rolling elements 5 filled within the rolling element rolling paths 10 move in the same direction as the slider 2 relative to the guide rail 1 while rolling within the rolling element rolling paths 10. Then, when each of the rolling elements 5 reaches the one end of the rolling element rolling path 10, the rolling element turns through the curved path 12 and is introduced into the rolling element return path 11. Subsequently, each of the rolling elements reaches the curved path 12 on the opposite side, then turns again and is returned to the rolling element rolling path 10. Each of the rolling elements endlessly repeats such a circulation within the rolling element circulation path.

Side seals 7 are attached to the outer side end surfaces of the end caps 2B so as to contact in a slidable manner with the upper surface 1a and the both side surfaces 1b, 1b of the guide rail 1, respectively, to thereby seal the openings of the gaps formed between the slider 2 and the guide rail 1. Each of the side seals 7 is a member which is integrally configured by rubber material and a core metal which is formed by an almost ⊐-shaped steel plate adjusted to the outer configuration of the end cap 2B.

The rubber surface on the inner side of each of the side seals 7 is formed in a shape so as to contact in a slidable manner to the upper surface 1a and the both side surfaces 1b, 1b of the guide rail 1 so that the gaps between the slider 2 and the guide rail 1 can be sealed. In this respect, the inner size of the rubber surface is set to be slightly smaller (about 0.1–0.2 mm) than the size contacting to the surface of the guide rail 1 in order to surely seal the gaps between the guide rail 1 and the side seal. In this case, the core metal does not contact to the guide rail 1.

In such a linear guide, the surface roughness of the rolling element rolling grooves 3, 4 is set that the average roughness Ra along the center line thereof is equal to or less than 0.20 $\mu$m. Since the surface of the rolling element rolling grooves 3, 4 are smooth as described above, the degree of reduction of the sliding resistance due to the initial abrasion can be suppressed to be 10% or less, and further the degree of generation of the powder due to the abrasion can be suppressed.

Figure 5:
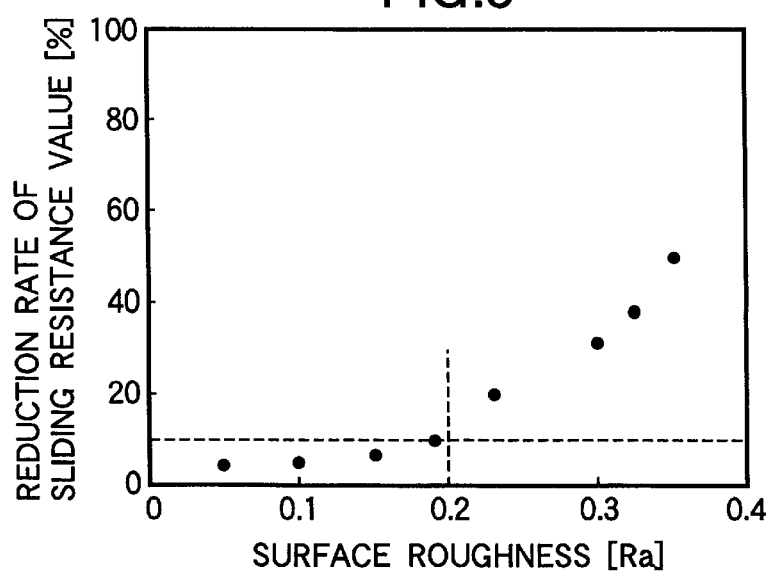
FIG. 5 is a graph showing the relation between the surface roughness of rolling element rolling grooves and the reduction rate of a sliding resistance.

FIG. 5 is a graph showing the correlation between the surface roughness (the average roughness Ra along the center line) of the rolling element rolling grooves 3, 4 and the reduction rate of the sliding resistance due to the initial abrasion. As clear from the graph of FIG. 5, the better the surface roughness, the lower the reduction rate of the sliding resistance becomes. That is, the reduction rate of the sliding resistance is 10% or less when the surface roughness is set that the average roughness Ra along the center line thereof is equal to or less than 0.20 $\mu$m.

In such a linear guide, since the time-lapse change rate of the sliding resistance is small, the processing of high accuracy can be realized when the linear guide is applied to the working machine (machining center). Further, since the Change rate of the sliding resistance in accordance with the moving speed of the slider 2 is small, even if the cutting speed changes in the processing (for example, arc cutting process etc.) using the working machine, the degree of the change of the sliding resistance is quite small and so the processing with high accuracy can be realized.

For example, when the linear guide is incorporated into a machine and used in a manner that it is driven by a motor through a ball screw, since the motor is selected depending on the sliding resistance at the initial stage, the motor may be placed in a state exceeding its specification after the sliding resistance decreases. However, when the surface roughness of the rolling element rolling grooves 3, 4 is set that the average roughness Ra along the center line thereof is equal to or less than 0.20 μm, since the sliding resistance can be set to a small value in advance, the selected motor is prevented from being placed in the state exceeding its specification and so the cost of the motor can be reduced.

Further, the explanation will be made as to the case, for example, where the linear guide is incorporated into a machine to perform positioning with high accuracy. In this case, if the linear guide is arranged such that the surface roughness of the rolling element rolling grooves 3, 4 of the slider 1 and the guide rail 1 is set that the average roughness Ra along the center line thereof is more than 0.20 μm, even when the correction value is set according to the value of the sliding resistance at the initial stage in the control of the driving apparatus, the required correction value changes when the sliding resistance decreases in accordance with the usage of the linear guide. As a result, the positioning accuracy is adversely effected.

However, if the linear guide is arranged such that the surface roughness of the rolling element rolling grooves 3, 4 is set that the average roughness Ra along the center line thereof is equal to or less than 0.20 μm, the sliding resistance can be set to a small value in advance and the reduction rate of the sliding resistance in accordance with the usage can be suppressed to a small value, so that the correction value at the initial stage can be made small. Further, since the degree of the change of the correction value is quite small, the degree of the adverse influence on the positioning accuracy can be made small to a large extent.

An example of the aforesaid configuration will be explained concretely. In the machine in which the linear guide is incorporated, if the rigidity in the sliding direction is 196N/μm and the sliding resistance is 392N for four sliders, since twice the rigidity and the sliding resistance acts at the time of the reversal movement, there will appear the lost motion of 4 μm (2×392N÷196N/μm=4 μm). In this case, even if the lost motion correction is performed, the error of the positioning accuracy will be 1.2 μm when the sliding resistance reduced by 30%.

In contrast, since the sliding resistance can be set to be smaller by 30% due to the reduction of the rolling friction coefficient caused by the preferable surface roughness, sliding resistance for four sliders in this case may be 274N (392N×70%), so that an amount of the lost motion becomes 2.8 μm. Since the absolute value of the sliding resistance is further reduced, the reduction rate of the sliding resistance thereafter becomes smaller value of 5%, and so it is expected that the error of the positioning accuracy will be suppressed to 0.14 μm. That is, the error of the positioning accuracy at the final stage can be realized to be about ⅑ of the error of the corrected positioning accuracy of 1.2 μm at the initial stage.

Further, in the aforesaid linear guide, since the friction coefficient is low when the rolling elements 5 roll, it is possible to make the sliding resistance at the initial stage small while maintaining the efficiency such as the rigidity to the similar degree. Furthermore, the noise caused by the usage of the linear guide (running of the slider 2) can be reduced.

Figure 6:
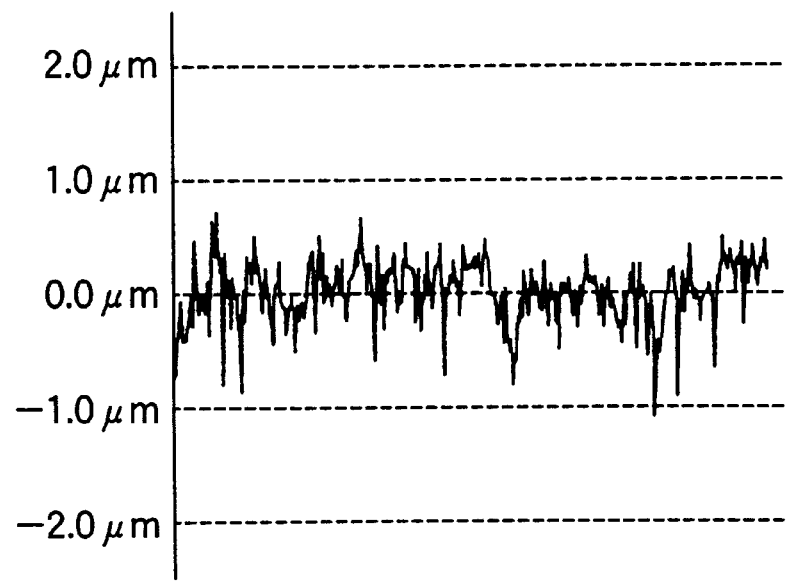
FIG. 6 is a diagram showing the measuring result of the surface roughness of rolling element rolling grooves of a slider (in a case where an average roughness Ra along a center line exceeds 0.20 μm)
Figure 7:
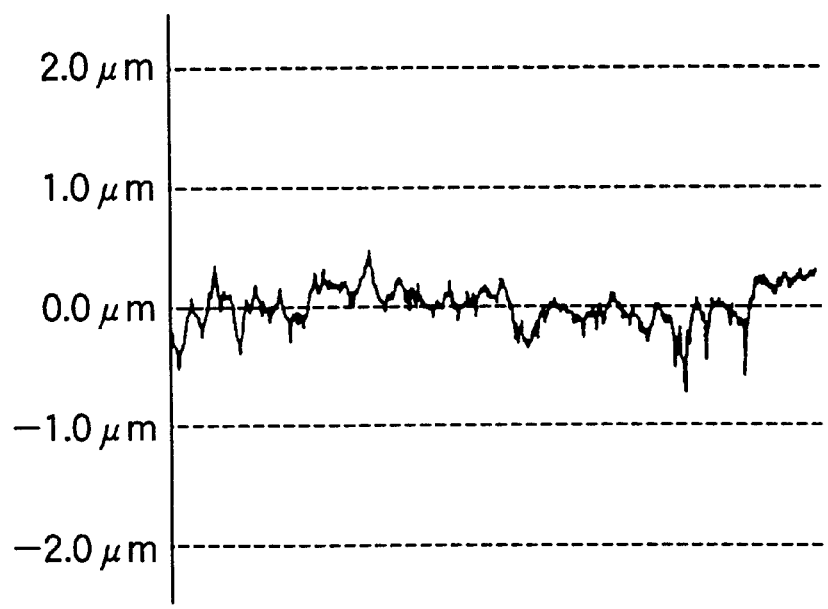
FIG. 7 is a diagram showing the measuring result of the surface roughness of rolling element rolling grooves of a slider (in a case where an average roughness Ra along a center line is 0.20 μm or less).

As a reference, the measuring result (measured chart) of the surface roughness of the rolling element rolling grooves 4 of the slider 2 is shown. That is, FIG. 6 shows the case where the surface roughness is set that the average roughness Ra along the center line thereof is more than 0.20 μm (0.23 μm), and FIG. 7 shows the case where the surface roughness is set that the average roughness Ra along the center line thereof is equal to or less than 0.20 μm (0.15 μm). In these measurement results, the measurements were performed along the circumferential direction of the surface of the rolling element rolling grooves 4 (that is, the abscissa of the chart represents the circumferential direction of the rolling element rolling grooves 4).

Embodiments

The linear guide according to the first and second embodiments and the comparative example 1 are almost same in the configuration as the aforesaid linear guide, but differ from the aforesaid linear guide in the surface roughness of the rolling element rolling grooves 3 of the guide rail 1 and the rolling element rolling grooves 4 of the slider 2.

That is, in the lineal guide Of the comparative example 1, the rolling element rolling grooves 3 of the guide rail 1 and the rolling element rolling grooves 4 of the slider 2 are subjected to the grinding process to thereby set the surface roughness to have the average roughness Ra along the center line of 0.30 μm.

In the linear guide of the first embodiment, the rolling element rolling grooves 3 of the guide rail 1 are subjected to the buffing processing after being subjected to the grinding processing to thereby set the surface roughness to have the average roughness Ra along the center line of 0.19 μm. Also, the rolling element rolling grooves 4 of the slider 2 are subjected to the tape processing after being subjected to the grinding processing to thereby set the surface roughness to have the average roughness Ra along the center line of 0.19 μm. The sliding resistance at the initial stage of this embodiment is almost same as the comparative example 1.

In the linear guide of the second embodiment, the rolling element rolling grooves 3 of the guide rail 1 and the rolling element rolling grooves 4 of the slider 2 are subjected to the super finishing processing like the first embodiment to thereby set the surface roughness to have the average roughness Ra along the center line of 0.19 μm. In this embodiment, the sliding resistance at the initial stage was smaller by 30% then the comparative example 1, and the sliding resistance reduced almost to the same level as the comparative example 1 in accordance with the usage of the linear guide.

The time-lapse change of the sliding resistance was measured while driving these linear guides (running the slider 2). The results of the measurement are shown in the graphs of FIGS. 8 and 9.

Figure 8:
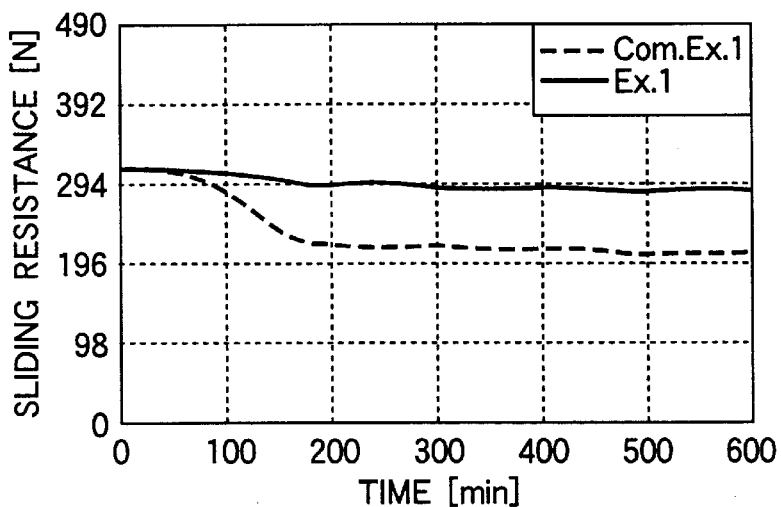
FIG. 8 is a graph showing the time-lapse change of a sliding resistance in accordance with the driving of the linear guide in the first embodiment and the comparative example 1.

As clear from FIG. 8, in the linear guide of the comparative example 1 (shown by a broken line), the abrasion due to the shake-down was caused at the initial stage and the sliding resistance reduced by about 32%. In contrast, in the linear guide of the first embodiment (shown by a steady line), the reduction rate of the sliding resistance is suppressed to be 10% or less.

Figure 9:
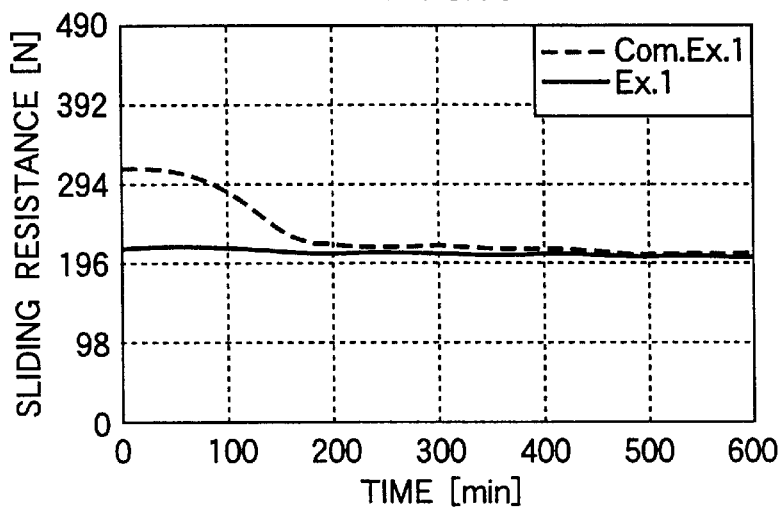
FIG. 9 is a graph showing the time-lapse change of a sliding resistance in accordance with the driving of the linear guide in the second embodiment and the comparative example 1.

As clear from FIG. 9, in the linear guide of the second embodiment (shown by a steady line), the sliding resistance at the initial stage can be set to a small value since the rolling friction coefficient of the rolling elements 5 is small, so that the reduction rate of the sliding resistance is suppressed to be about 4.5%. However, in this embodiment, the property such as the rigidity can be maintained to almost the same degree as the comparative example 1 (shown by the broken line).

Next, the explanation will be made as to the method of setting the surface roughness of the rolling element rolling grooves 3, 4 to have the average roughness Ra along the center line of 0.20 μm or less. Although this method is not limited to the particular one, there is a method, that, for example, the rolling element rolling grooves 3, 4 are subjected to the super finishing processing or the shake-down running after being subjected to the grinding processing.

Figure 10:
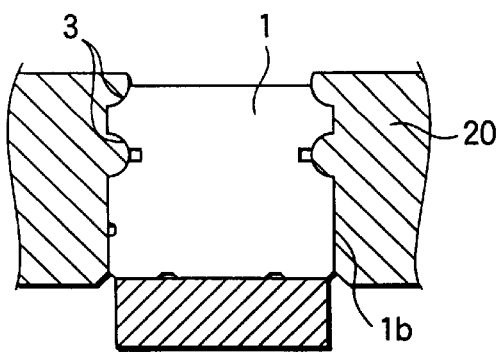
FIG. 10 is a diagram for explaining a method of subjecting the grinding processing to the rolling element rolling grooves of a guide rail.

A method shown in FIG. 10, for example, may be raised as the concrete example of the grinding processing. In this method, the rolling element rolling grooves 3 of the guide rail 1 are subjected to the grinding processing by a grinding stone 20 which configuration coincides with the shape of the side surface 1b of the guide rail 1 (that is, the shape having convex portions fitting to the concave grooves of the rolling element rolling grooves 3, 3).

As concrete examples of the super finishing processing, there are the super finishing processing, the tape processing, buffing processing, polishing processing, the lapping processing etc., for example.

The shake-down running is performed by running the slider 2 about 1 km after the assembling of the linear guide (as the finished product state). In this respect, the shake-down running of the guide rail 1 may be performed by using the slider for the shake-down running or the shake-down running of the slider 2 may be performed by using the guide rail for the shake-down running.

In the aforesaid embodiments, the explanation is made as to the example where the surface roughness of all the rolling element rolling grooves 3, 3, 3, 3, 4, 4, 4, 4 is set to have the average roughness Ra along the center line of 0.20 μm or less. However, the effects like the aforesaid embodiments can also be attained when the surface roughness of at least two columns of all the rolling element rolling grooves 3, 3, 3, 3, 4, 4, 4, 4 is set to have the average roughness Ra along the center line of 0.20 μm or less.

Further, one of or both the opposed two rolling element rolling grooves 3, 4 may be arranged in a manner that the surface roughness thereof is set to have the average roughness Ra along the center line of 0.20 μm or less. Furthermore, the surface roughness of the rolling element rolling grooves 3 of the guide rail 1 and the surface roughness of the rolling element rolling grooves 4 of the slider 2 may be set to have the average roughness Ra along the center line of 0.20 μm or less by different methods, respectively.

The aforesaid embodiments show examples of the invention and the construction of the detailed portions etc. of the linear guide according to the invention is not limited to these embodiments. For example, although in the embodiments, the guide rail 1 and the slider 2 have two columns of the rolling element rolling grooves 3, 4 at the one sides, respectively, the numbers of the rolling element rolling grooves is not limited to the particular number in the linear guide of the invention, and the invention is applicable in the similar manner to the case where one column or at least three columns of the rolling element rolling grooves are provided at the one side.

Hereinafter, the other embodiment of the invention will be explained.

Figure 4:
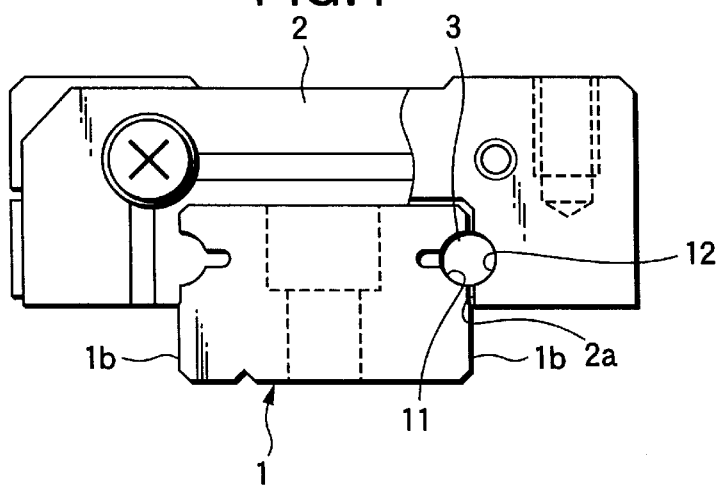
FIG. 4 is a diagram showing the configuration of a small-sized linear guide.

As a linear guide configured as shown in FIG. 4, there is prepared one in which the width of a guide rail 1 is 7 mm and each of the rolling element rolling grooves 11 of the guide rail 1 and the rolling element rolling grooves 12 of a slider 2 is subjected to the honing process after the grinding process. Further, there is prepared another linear guide having the same configuration in which each of the rolling element rolling grooves 11, 12 are not subjected to the honing process after the grinding process.

Figure 11:
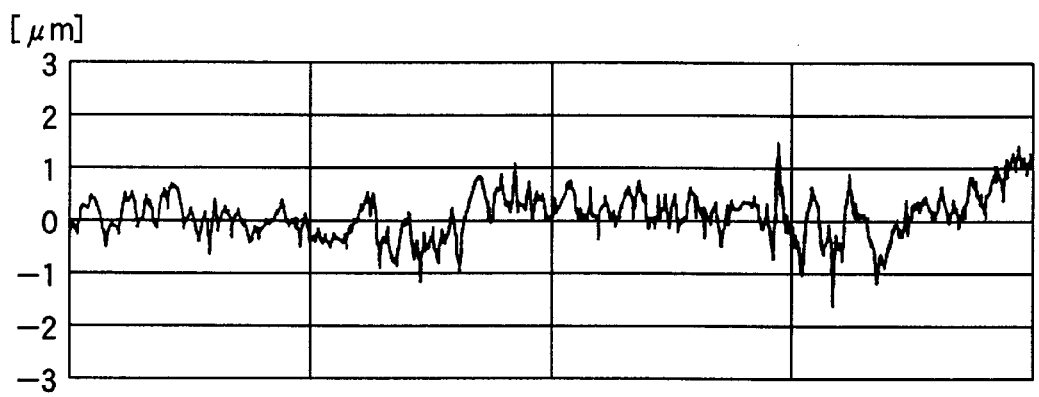
FIG. 11 is a graph showing roughness of the surface of a rolling element rolling groove having not been subjected to the honing process in the linear guide of the embodiment.
Figure 12:
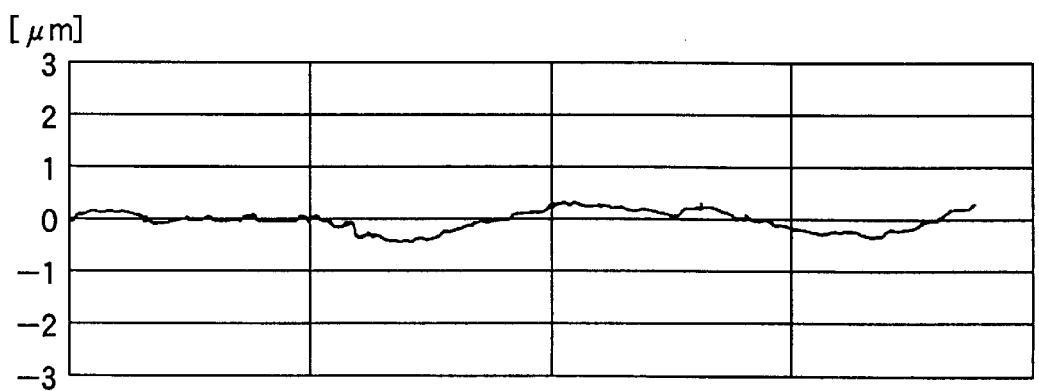
FIG. 12 is a graph showing roughness of the surface of a rolling element rolling groove having been subjected to the honing process in the linear guide of the embodiment.

The roughness of the surface of the groove having not been subjected to the honing process is shown in FIG. 11. The roughness of the surface of the groove having been subjected to the honing process is shown in FIG. 12. The average roughness (Ra) along the center line of the surfaces of the grooves having not been subjected to the honing process was 0.36 μm, while the average roughness (Ra) along the center line of the surfaces of the grooves having been subjected to the honing process was 0.16 μm.

The experiment was made as to the long term accuracy of these linear guides by performing the 600 km running test under the following condition.

Experimental Condition

Figure 13:
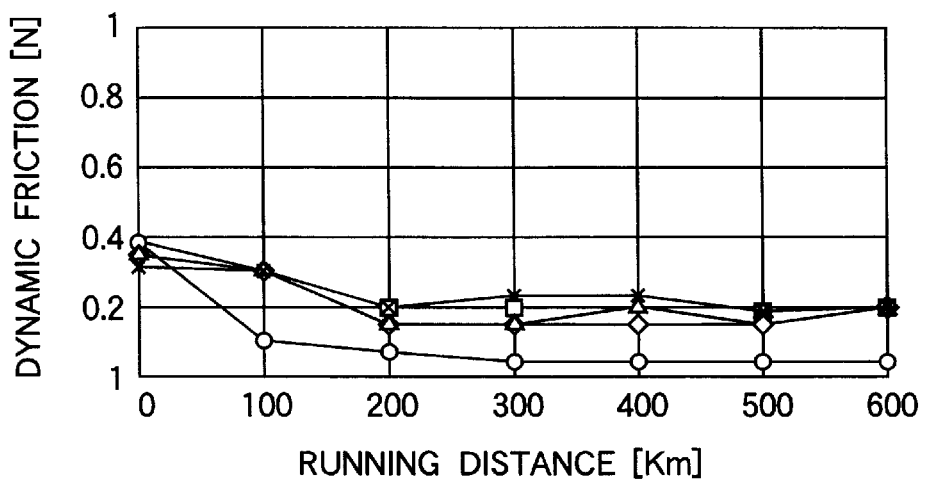
FIG. 13 shows graphs representing the relation between running distances and dynamic frictions as to a linear guide having rolling element rolling grooves having been subjected to the honing process and a linear guide having rolling element rolling groves having not been subjected to the honing process.

Posture of the linear guide: horizontal
Lubricant: "BRAYCOTE 602EF" (fluoro grease)
External load: 4.9N per one slider
Running speed: 600 mm/sec.
Stroke: 150 mm FIG. 13 shows graphs representing the relation between the running distances and the dynamic frictions as to the linear guide having the rolling element rolling grooves 11, 12 having been subjected to the honing process and the linear guide having the rolling element rolling groves having not been subjected to the honing process. In FIG. 13, "□", "Δ", "◇", "x" represent data in the case where the grooves have been subjected to the honing process, while "○" represents data in the case where the grooves have not been subjected to the honing process.

As clear from these graphs, as to the linear guide having the rolling element rolling grooves 11, 12 having been subjected to the honing process, the reduction of the preload due to the initial abrasion did not occur even when the running distance became 600 km. In contrast, as to the linear guide having the rolling element rolling grooves 11, 12 having not been subjected to the honing process, the reduction of the preload due to the initial abrasion occurred and the servo motor vibrated when the running distance became. 300 km.

As described above, it will be understood that, when the rolling element rolling groves of the linear guide are subjected to the honing process and the average roughness. (Ra) along the center line is set to 0.16 μm, the accuracy of the linear guide can be held for a long time even when the linear guide is lubricated by the fluoro grease.

Next, the rolling element rolling grooves 11, 12 were subjected to the honing process under various conditions so that the average roughness (Ra) along the center line takes various values, and the linear guide is assembled by combining the guide rail 1 and the slider 2 having the rolling element rolling grooves 11, 12 with the same value of Ra. Then, the experiment was made for checking the sliding resistance value change rate of the slider 2. In this respect, the sliding resistance value change rate is obtained in the following manner. That is, the sliding resistances of the slider 2 are measured at the time point before the test running and also at the time point where the running test was made until the running distance becomes 50 km, and the absolute value of the difference between these measured values is divided by the resistance value at the time point before the test running to thereby obtain the sliding resistance value change rate. The smaller the value is, less the initial abrasion of the linear guide occurs.

Figure 14:
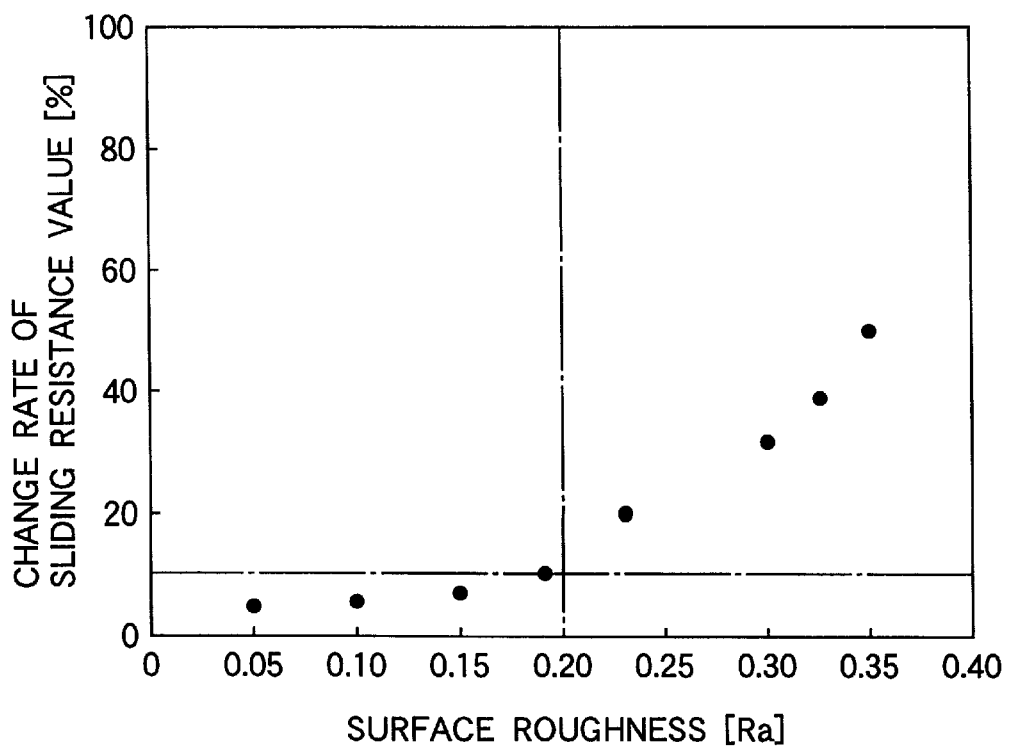
FIG. 14 is graph showing the relation between sliding resistance value change rates of a slider and surface roughness (Ra) of rolling element rolling grooves which are obtained from the embodiment.

FIG. 14 is a graph showing the relation between the sliding resistance value change rates of the slider 2 and the surface roughness (Ra) of the rolling element rolling grooves 11, 12 which were obtained from the test result. As clear from this graph, the sliding resistance value change rate takes a small value of 10% or less when the surface roughness (Ra) of the rolling element rolling grooves 11, 12 is equal to or less than 0.20 μm, while the sliding resistance value change rate increases rapidly when Ra exceeds 0.20 μm. Incidentally, the graph same as FIG. 14 can be obtained in the case where the super finishing process, the lapping process, the polishing process, the buffing process or the tape process is performed in place of the honing process.

As described above, when the average roughness (Ra) along the center line of the rolling element rolling grooves of the linear guide is set to be equal to or less than 0.20 μm, the initial abrasion of the linear guide hardly occurs even if the rolling element rolling grooves are lubricated by the fluoro grease, so that it will be understood that the accuracy of the linear guide can be held for a long time.

Incidentally, when one or the combination of at least two of surface-active agent (for example, carboxylate etc. in the PTFE system grease), fine grain such as cluster diamond, silica, magnesia oxide etc., solid lubricant (silicon nitride, tungsten disulfide, mica, organic system super fine grain, amino-acid system solid lubricant etc.) is added to the fluoro grease, the lubricant efficiency of the fluoro grease is improved. Thus, when the rolling element rolling grooves are lubricated by the fluoro grease to which such additive agent is added, the durability of the linear guide can be further improved.

Further, in the embodiment, although the explanation has been made as to the linear guide having a pair of the rolling paths, that is, two columns of the rolling paths, the invention is not limited thereto. That is, the invention is also applicable to a symmetrical linear guide having at least two pairs of rolling paths, that is, at least four columns of rolling paths, or to a non-symmetrical linear guide having a column of rolling path at the one side and two columns of rolling paths at the other side. Further, the rolling element is not limited to a ball and a linear guide having rollers as the rolling elements may be employed.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As described above, according to the linear guide of the first aspect of the invention, since the surface roughness of at least a part of the rolling element rolling grooves of the guide rail and the rolling element rolling grooves of the slider is set to have the average roughness Ra along the center line of 0.20 μm or less, the reduction of the sliding resistance and the generation of the powder due to the abrasion caused by the initial abrasion can be suppressed.

Further, as described above, according to the second aspect of the invention, the accuracy of the linear guide which is lubricated by the fluoro grease can be held for a long time. Thus, the linear guide according to the invention can be in particular preferably used in a circumstance such as a stepper etc. where generation of dust is not preferable and light with a high energy is irradiated thereon.

What is claimed is:

1. A linear guide comprising:

a guide rail having at its outer surfaces rolling element rolling grooves extending in an axial direction thereof;

a slider which is assembled to said guide rail and has rolling element rolling grooves opposing to the rolling element rolling grooves of said guide rail, and a plurality of rolling elements rotatably disposed within rolling element rolling paths formed by both the rolling element rolling grooves of the guide rail and the slider, wherein at least one of said rolling element rolling grooves of the guide rail and the slider has a surface that is set to have an average roughness Ra along a center line thereof of 0.20 μm or less.

2. The linear guide according to claim 1, further comprising:

fluoro grease for lubricating the rolling element rolling grooves of the guide rail and the rolling element rolling grooves of the slider.

3. The linear guide according to claim 2, wherein said surface is subjected to precise finishing process after grinding process.

4. The linear guide according to claim 3, wherein said precise finishing process is selected from the group essentially consisting of super finishing process, honing process, lapping process, polishing process, buffing process, and tape process.

5. The linear guide according to claim 1, wherein said surface is subjected to precise finishing process after grinding process.

6. The linear guide according to claim 5, wherein said precise finishing process is selected from the group essentially consisting of super finishing process, honing process, lapping process, polishing process, buffing process, and tape process.

7. The linear guide according to claim 1, wherein at least one of said rolling elements is a ball which contacts at four points with said rolling element rolling path.

* * * * *